United States Patent [19]

Moore et al.

[11] Patent Number: 5,265,208
[45] Date of Patent: Nov. 23, 1993

[54] ADDRESSABLE COMPUTER TAPE DRIVE ACTIVATION SYSTEM

[75] Inventors: John K. Moore, Loveland; Mark E. Nash, Lyons, both of Colo.

[73] Assignee: Hewlett-Packard Company, Palo Alto, Calif.

[21] Appl. No.: 693,677

[22] Filed: Apr. 30, 1991

[51] Int. Cl.$^5$ .............................................. G06F 13/00
[52] U.S. Cl. .................................. 395/275; 395/425; 395/500
[58] Field of Search ................... 364/DIG. 1, DIG. 2; 395/275, 325, 425, 500; 360/48, 55, 51; 369/59

[56] References Cited

U.S. PATENT DOCUMENTS

| | | | |
|---|---|---|---|
| 3,710,351 | 1/1973 | Nakamura | 340/172.5 |
| 3,715,725 | 2/1973 | Kievit et al. | 340/147 |
| 3,999,163 | 12/1976 | Levy et al. | 340/172.5 |
| 4,210,959 | 7/1980 | Wozniak | 364/200 |
| 4,357,657 | 11/1982 | Fellinger | 364/200 |
| 4,494,196 | 1/1985 | Greer | 364/200 |
| 4,541,019 | 9/1985 | Precourt | 360/15 |
| 4,742,448 | 5/1988 | Sander et al. | 364/200 |
| 4,875,158 | 10/1989 | Ashkin et al. | 364/200 |
| 5,003,408 | 3/1991 | Farkas et al. | 360/43 X |

OTHER PUBLICATIONS

Irwin Tape Drive Manual; Irwin, Inc.; SX and 80SX Installation Manual; pp. 4–7.
Archive Tape Drive Manual; Archive, Inc.; Chapter 2 Internal ArchiveXL Installation; pp. 10–13.
Excerpt from Everex Floppy Tape Drive Manual; Everex, Inc.; Installation-Everex Floppy Tape Drive; pp. 3–5.
Standard for Basic Drive Interface; Quarter Inch Cartridge Drive Standards; Standard for Basic Drive Interface for Flexible Disk Controller Compatible ¼ Inch; Jun. 1986; pp. 1–4.
Standard for Basic Drive Interface; Quarter Inch Cartridge Drive Standards, Inc.; Development Standard for ¼ Inch Cartridge Tape Drive Intelligent Interface; Apr. 19, 1988; pp. 1–45.
Standard for Basic Drive Interface; Quarter Inch Cartridge Drive Standards, Inc.; Common Command Set Interface Specification for Flexible Disk Controller Based Minicartridge Tape Drives; Dec. 1989.
82077AA Specification Sheet; Intel Corporation; Intel 82077 Data Sheet.

Primary Examiner—Robert L. Richardson

[57] ABSTRACT

A selectible computer tape drive activation and deactivation technique apparatus is disclosed. The invention integrates with existing floppy controllers in a manner which allows activation and deactivation of a computer tape drive without the need for select lines. The invention programs the floppy controller so as to generate an activation command which may be appended by an address to specify the specific drive involved. Both the command and the argument are chosen to be consistent with existing Quarter Inch Committee standards. With respect to the deselect method, additionally a failsafe, independent deactivation path exists to turn off the tape drive in the event any conflict in drive operations were to exist.

78 Claims, 5 Drawing Sheets

ADDRESSABLE COMPUTER TAPE DRIVE ACTIVATION SYSTEM

BACKGROUND OF THE INVENTION

Generally the invention relates to the field of controlling computer tape drive devices which interface with a computer through standard floppy controller circuitry. Specifically, the invention focuses on techniques to specifically activate and deactivate the tape drive without any need for additional circuitry or revision to existing floppy controller designs.

Since the advent of computers, the need to store information has grown dramatically. This information storage is frequently accomplished through devices which interconnect and act relatively independently in response to signals received from the main data processing functions of the computer. These devices, known as peripheral devices, act to retrieve data from the main computer memory and then to store such data on a separate media associated with the peripheral device.

One of the aspects of typical memory devices in computer systems is their volatility—they can unintentionally lose their contents occasionally. To overcome this undesirable aspect, backup devices have evolved. Such devices serve the simple function of separately storing large amounts of data on relatively nonvolatile media. In the field of these specialized devices the use of magnetic tape media has greatly eclipsed all other types of storage media. As a result of this demand, specialized peripheral computer tape drives have been developed. These tape drives have been especially designed to integrate into the existing electrical and mechanical designs of computer systems. Since the development of electrical and mechanical computer designs preceded the development of the computer tape drives, the design of tape drives has been constrained for practical and commercial reasons.

The significance of these constraints is perhaps underscored through analogy with the development of computers themselves. As may be recalled, computers were initially developed with a variety of architectures and configurations. Over time, however, the simple market dominance of one or two companies—most notably International Business Machines Corporation—resulted in standardization of many attributes of the computers. In essence, those companies that continued to make computers which did not function in a fashion consistent with the major portion of the market were often doomed to commercial failure. Thus it became very commercially significant to be able to claim that your computers were "IBM compatible" or functioned well with other significant segments of the market.

With respect to the development of peripheral devices, it similarly has become a standard that many of these devices function and integrate with the computer in a standardized fashion. This has evolved into a configuration whereby the drive device communicates and is controlled by a a floppy controller. As the name implies this controller was originally designed to control the then-predominant storage drive device—a floppy drive. Since computer tape drives became popular only after many computers utilizing floppy controllers were already in existence, an important commercial attribute which was well recognized by those skilled in the art was that such tape drives should integrate with existing designs, that is they should use the floppy controller.

While challenges were presented in utilizing a controller not specifically designed for the tape drive device, these were eventually overcome. To promote standardization, the fashion in which computer tape drives communicate and interact with the floppy controller has even evolved into a unique set of standards. These standards have been developed by a consortium of those involved in the computer tape drive industry known as the Quarter Inch Cartridge Drives Standards, Inc. (QIC). Thus the standards have become known as QIC standards. While these standards have had a generally positive impact, as with any standard, they have also acted to limit the thinking of those skilled in the art. Rather than merely presenting a means within which to achieve an end, such standards have at times become the end in themselves.

As mentioned, the QIC standards address not only the actual function of tape drives but also how such drives interact with the floppy controller. For instance, since the techniques of transferring control of data are fundamentally different between tape drives and floppy drives, the QIC standards have established that one line, the step line (a line which was designed to move the head on a floppy drive in a step-wise fashion) is used as a serial data transfer line for tape drive devices. An important attribute regarding how computer tape drives function through use of a floppy controller is the manner in which the floppy controller selectively activates and deactivates the particular tape drive. As to this function, the majority of tape drives and floppy controllers function similarly—each uses a "select line". This select line is actually a separate line which when activated "turns on" the device (whether floppy drive or other devices) to which it is connected, and when deactivated "turns off" that drive. One of the limitations of this configuration is the need for a separate line for each drive. Since floppy controllers exist in many instances with only two select lines, the number of drives can be likewise limited.

Several solutions to this well recognized limitation have been developed. By far the most prevalent commercially is the solution which utilizes a separate circuitry card to expand the number of select lines possible. While this solution is effective, it has two important commercial drawbacks. First, it requires additional hardware and thus additional cost. Second, it significantly complicates the difficulty of installing a tape drive. Recently, a system which apparently has not been publicly disclosed as such, appears to have been developed which utilizes a particular command sequence within the QIC standard command structure. These commands are then transmitted across the step line to activate the tape drive. While this system does eliminate some aspects of the need for select lines, the design of it is such that limitations and potential conflicts exist for specific drive configurations.

While each of the above limitations have been recognized, a solution to such problems has not, prior to the present invention, been available. Certainly the long felt need existed and as the present invention shows, the implementing arts and elements had been long available. Perhaps due to the commercial impact of standardization, those skilled in the art simply failed to recognize that a solution could be had without violating such standards. Surprisingly, the standards and the solutions proposed by those skilled in the art explicitly taught away from the direction from which the present inventors have approached the problem. Rather than adding hardware needing separate installation efforts or working within the confines of a standardized command structure, the inventors recognized that a new structure could be implemented and still meet the true purpose of standardization.

In addition to the problems posed with respect to initiating operation of a computer tape drive, there are problems with respect to disengaging the tape drive as well. Again, the invention poses similar solutions to such limitations. The invention also, however, goes beyond that and addresses potential conflict problems as well.

II. SUMMARY OF THE INVENTION

The present invention discloses a method and apparatus which works together with existing floppy controllers to selectively activate and deactivate the computer tape drive. Instead of utilizing the select lines, the invention discloses a command structure whereby a specific serial command transmitted across the step line of the floppy controller acts to cause the tape drive to initiate or disengage operation. This specific command is appended by an address which is specific to that particular tape drive. The address may also be expanded to include security codes and other informational needs. In operation, the computer tape drive, upon sensing the select command, automatically acts to compare the appended address to its own unique address prior to initiating operation. Once a successful comparison is made the tape drive initiates operation. Again, the methods of disengaging the tape drive involve similar aspects.

An object of the present invention is to provide both the method and a device which integrate with existing designs of computers. Accordingly, it is an object to both activate and disengage computer tape drives through use of the floppy controller. In so utilizing the floppy controller, an object is to provide an invention which does not require any physical change to the floppy controller and which avoids any needs for additional hardware in order to accomplish its aims.

Similarly, it is also an object of the invention to provide both a method and an apparatus which functions consistently with existing computer drive standards. The invention therefore allows the tape drive to operate through existing QIC standards. Another object in this regard is for the invention to expand the information possibilities available consistent with the QIC standards.

An important object of the present invention is to overcome the limitations on the number of drives possible for most computer systems. Accordingly, the present invention allows selection of any number of computer tape drives without any need to utilize a select line of a floppy controller. An object is thus to free the select lines to be used by other drives not having the capabilities of the present invention.

Another object of the invention is to provide a device which simplifies installation needs. Naturally it is an object to avoid any need to install additional cards or other hardware as part of installing the computer tape drive. Additionally, it is an object to afford the installer a simple and visually verifiable way of changing the address of each computer tape drive if necessary.

As mentioned, an object is to address both the activation and deactivation functions. For each, it is an object of the invention to provide a simple and efficient manner in which to accomplish the task while also achieving the other goals of the invention. In addition, it is also an object of the invention to provide a system which has fail-safe attributes. Thus it is an object of the invention to provide an automatic deselection routine which acts to disengage the computer tape drive in the event any other drive device is concurrently selected.

Yet another object of the invention is to provide a communication technique whereby specific information is transferred and confirmed by the computer tape drive. An object thus is to provide for security coding, serial number, or other specific information capabilities for further integration with software and other aspects of the computer functions.

Naturally, further objects of the invention are disclosed throughout the specification and claims.

III. BRIEF DESCRIPTION OF THE DRAWINGS

FIG. 3a and 3b are representations of one communication possibility according to the present invention.

FIGS. 4a and 4b are schematics of tape drive systems.

IV. DETAILED DESCRIPTION OF THE PREFERRED EMBODIMENTS

Figure 1:
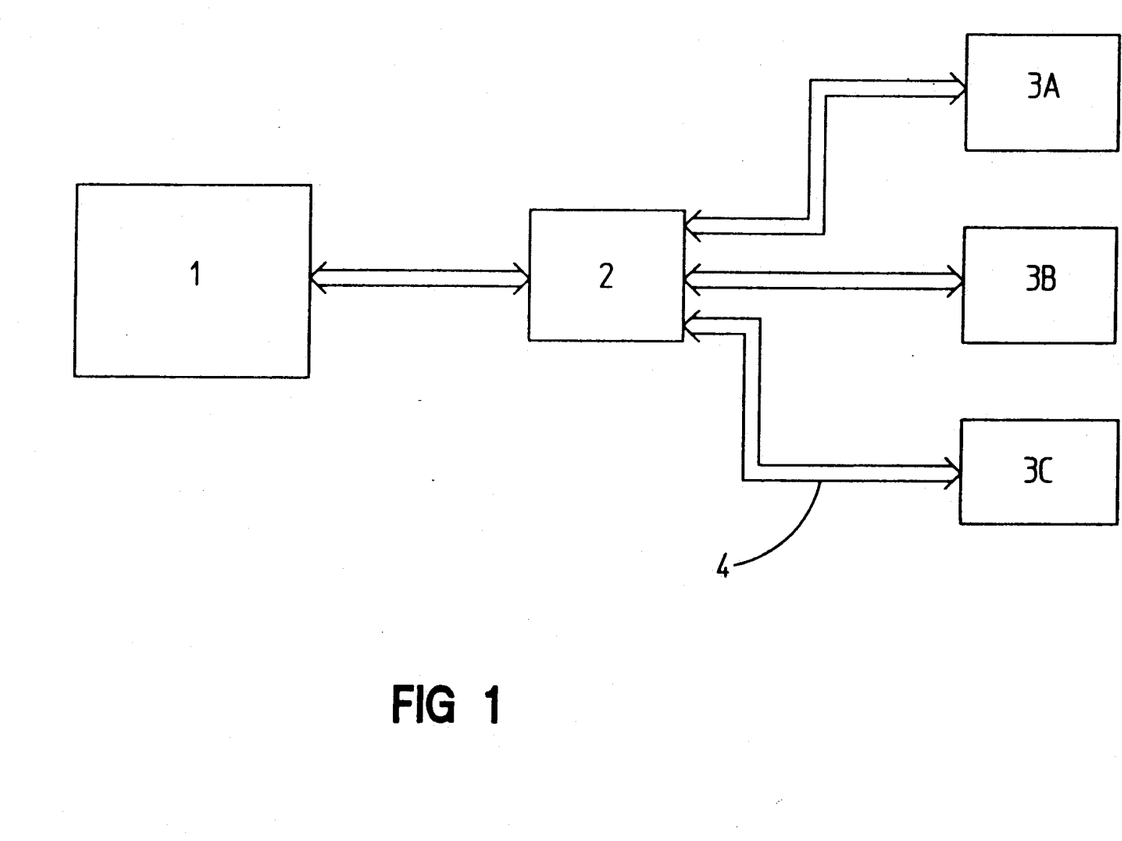
FIG. 1 is a schematic representation of the communication paths from the main computer through the floppy controller to a variety of peripheral devices.

As can be seen from the drawings, the present invention is relatively simple in nature and can be easily accomplished by those skilled in the art. Referring to FIG. 1 it can be easily understood that main computer system (1) communicates in part with floppy controller (2) which, in turn, controls and communicates with a variety of peripheral devices (3). As shown in FIG. 1, it can be seen that floppy controller (2) may be configured to communicate and control several devices including floppy drive a: (3a), floppy drive b: (3b), and computer tape drive (3c). In focusing on computer tape drive (3c), it can be seen that floppy controller (2) is connected to computer tape drive (3c) by wiring to establish communication path (4). Communication path (4) serves, as is well known in the art, to transmit both control signals and data both to and from computer tape drive (3c).

Figure 2:
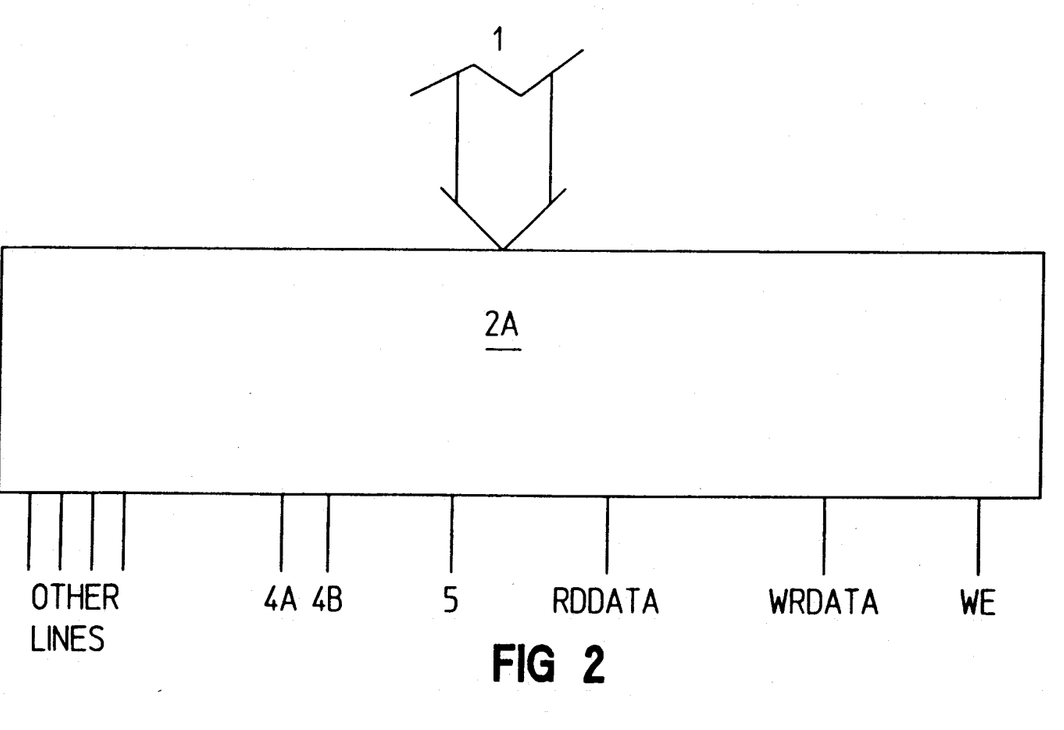
FIG. 2 is a schematic representation of the floppy controller showing several of its communication lines.

Referring to FIG. 2, the functioning of floppy controller (2) is also easily understood. When floppy controller (2) receives information or commands from main computer system (1), floppy controller logic (2a) acts to effectively transform such information and transmit it in a manner which achieves the desired purposes. This is accomplished through the floppy controller logic (2a). According to the present invention, floppy controller logic (2a) may be programmed, upon receipt of the appropriate communication from main computer system (1), to select the appropriate activation command and also to generate the appropriate tape address. These of course may easily be combined into a command and an argument.

As is well known in the art, floppy controller logic (2a) may combine a number of devices and features to internally achieve its aims. This may include a variety of programmable and hardwired devices, memory, comparison capabilities, and capabilities to generate the appropriate signals. As mentioned earlier, through the development and use of floppy controller (2), standards have evolved through which such communication has become relatively uniform. This is achieved through communication path (4) which may be a combination of a number of different electronic connections or lines. As shown in FIG. 2, lines have numerous functions. With respect to the use of floppy controller (2) to control and communicate with computer tape drive (3c), it should be understood that the lines coming from floppy controller (2) which may comprise communication path (4) may not include all lines coming from floppy controller (2), and may have functions very different than their originally intended purpose for floppy drives. All that is essential for communication path (4) is that it allow the transmission of the desired commands, therefore other types of communication means could also be provided.

Figure 4A:
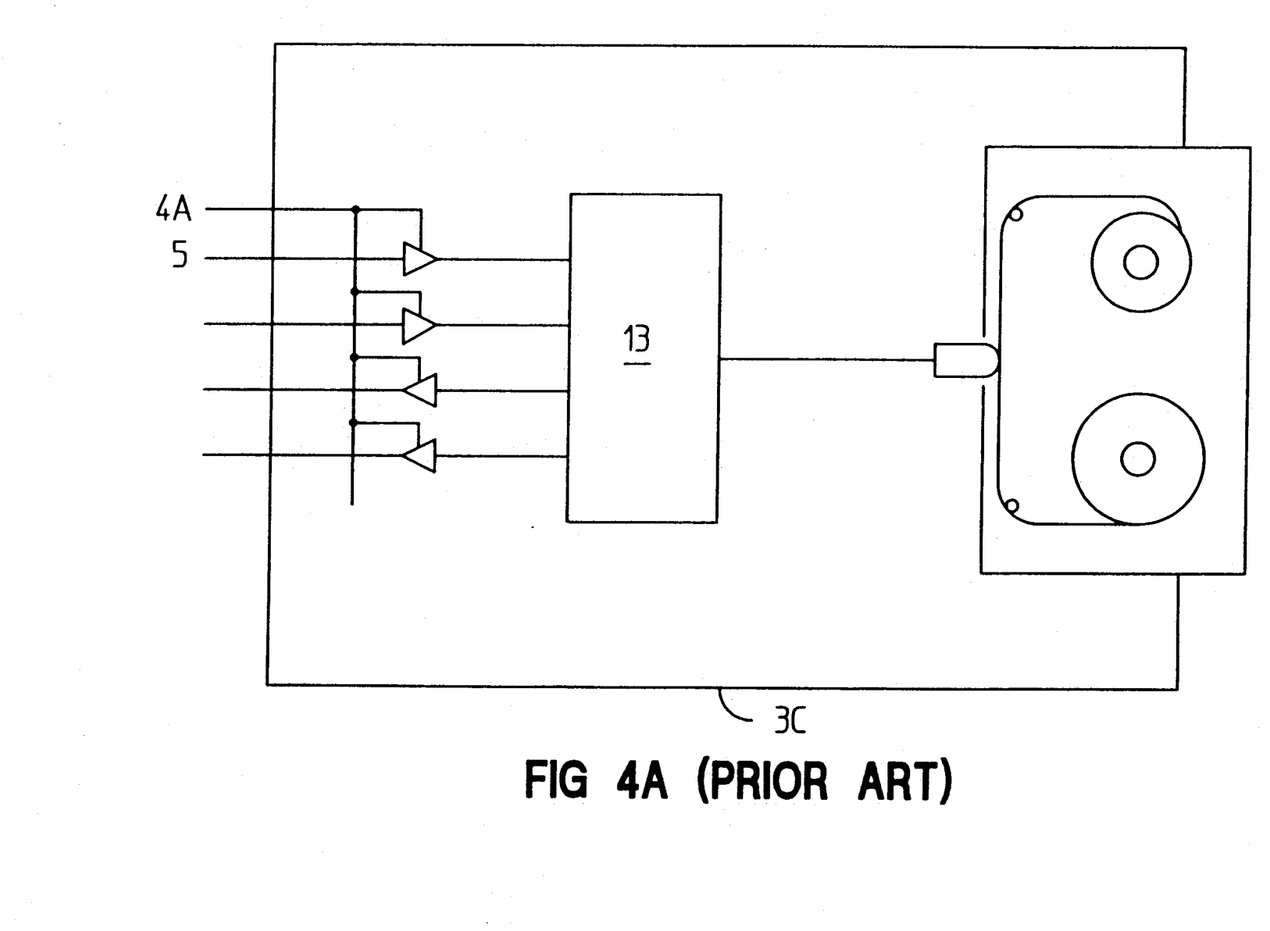
FIG. 4a shows a tape drive as it exists in the prior art which utilizes the select line for activation and deactivation.

With respect to the lines which are of interest to the present invention, it can be seen that two select lines (4a and 4b) may exist as well as a step line (5). As mentioned earlier, some floppy controllers have only two select lines; some have four. As shown in FIG. 2, two select lines (4a-4b) are shown. Under the teachings of most prior art, only two lines would not permit the computer configuration as shown in FIG. 1 where three peripheral devices (3a-3c) are utilized. To achieve such a configuration prior to the present invention, often additional circuitry was required in order to expand the number of select lines. This additional circuitry would have the drawbacks mentioned earlier. Referring to FIG. 4a, it can be seen as one example that select line (4a), according to the teachings of the prior art, would connect with computer tape drive (3c) in order to activate and disengage computer tape drive (3c). As mentioned earlier, the present invention eliminates the need for select lines (4a and 4b) with respect to the control of computer tape drive (3c). In so doing it not only simplifies installation requirements but also allows the system as shown in FIG. 1 to be expanded for a number of additional peripheral devices (3).

Referring again to FIG. 2, it can be seen that an important aspect of communication path (4) with respect to the present invention is that of step line (5). Since floppy controller (2) was originally designed to control floppy drives, step line (5) was originally included as a separate line through which the stepper motor of a floppy drive would be moved. In utilizing floppy controller (2) to control computer tape drive (3c), those skilled in the art of computer tape drives have developed the standard of utilizing step line (5) as the main serial communication line. Step line (5) thus serves to transmit commands from floppy controller (2) to computer tape drive (3c). These serial commands are usually those developed by the Quarter Inch Cartridge Drive Standards, Inc. group which act to control computer tape drive (3c). Perhaps surprisingly after being exposed to the present invention, the standard commands have not included commands which act to activate or disengage computer tape drive (3c) thus further teaching those skilled in the art to rely upon select lines (4a and 4b) for this function.

Figure 3A:
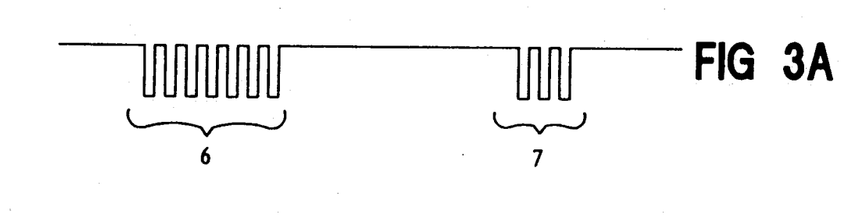
FIG. 3a shows a serial activation sequence whereby both the command and an address are serially transmitted.
Figure 3B:
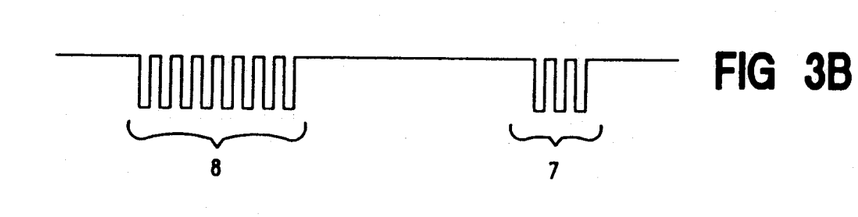
FIG. 3b likewise shows a deactivation sequence for the same drive.

In relatively simple and straight-forward fashion, the present invention discloses the method whereby step line (5) not only transmits commands which activate and disengage operation of computer tape drive (3c) it also acts to transmit an identification to select which device is to be activated or disengaged. In so doing, the present invention allows for specific identification of each computer tape drive device in a very simple manner. Referring to FIGS. 3a and 3b, it can be seen how these communications through step line (5) are configured.

FIG. 3a shows a representation of the command sequence transmitted from floppy controller (2) through step line (5) to computer tape drive (3c) according to the present invention. As can be seen, each communication example can be conceptually divided into two components, a command and its argument. In FIGS. 3a and 3b, this includes activation command (6) and tape drive address (7). FIG. 3b, likewise, includes deactivation command (8) and tape drive address (7). Each of these have been simplified in FIG. 3 to promote understanding of the fundamental nature of this invention. In selecting activation command (6), it should be understood that floppy controller (2) may simply specify utilizing a particular digital code from a number of alternative possibilities.

Referring to the activation sequence shown in FIG. 3a, it can be seen that a single activation command (6) is transmitted first. While naturally other possibilities exist, the present invention uses this configuration to promote simplicity. Activation command (6) consists of a series of pulses transmitted on step line (5). Computer tape drive (3c) contains circuitry, as is well known in the art, designed to monitor step line (5), to receive such command, and to sense the presence of such pulses. While activation command (6) shown in FIG. 3a is merely a sequence of seven pulses, in actuality the present invention utilizes 46 pulses.

To achieve efficiency, only a single command is utilized, whereas other efforts have lead those skilled in the art to believe that a series of commands was necessary, the present inventors provide otherwise. As mentioned earlier, the Quarter Inch Cartridge group has developed a series of standards not only for wiring configurations but also for communication techniques. As to the latter, these standards include a number of commands identified by successive pulses. In order to achieve the goal of accommodating existing designs, the present invention utilizes an unused number of pulses as its own activation command. This avoids any confusion by other traditional drives which may also be monitoring step line (5) since such pulses have no other function. Since the command consisting of 46 pulses has as yet been unused by the Quarter Inch Cartridge group, it has been chosen. Naturally this decision is arbitrary. It should be understood that certainly other commands could be utilized and still fall within the scope of the present invention.

Importantly, the entire activation sequence shown in FIG. 3a includes not only activation command (6) but also tape drive address (7). As is well known in the computer arts, upon sensing activation command (6) specific programming can be configured to control computer tape drive (3c) to then listen for tape drive address (7). Tape drive address (7) can, of course, have any length. It may also consist of conceptually distinct information groups and thus comprise an extended address. For instance, an address indicating the specific drive location could be expanded to include manufacturer or private label information such that the software selectible control programs would only work with a specific manufacturer's drive and the like. In addition, of course, serial number information could be included for further control even within one manufacturer's products. All such information may then be read into memory and then be compared by tape drive (3c) through processing or executing instructions or otherwise. This comparison may utilize stored, or perhaps hardwired values to cause an activation sequence to initiate. These values, if stored in memory such as ROM should naturally be read into ROM (whether located in the tape drive (2) or not) prior to attempting such comparison. This comparison could also be a conditional correlation routine in which particular values might trigger different responses. Such could include alternative predetermined messages, access to specific software routines, and the like.

Upon sensing the appropriate activation command (6) and appropriate tape drive address (7), the present invention then serves to activate tape drive (3c) or to initiate the operation of tape drive (3c). Although the same configuration is shown in FIG. 3b, naturally, deselecting the particular drive could be accomplished without any need for an address as any deselect command might acceptably "turn off" or disengage all such tape drives connected to floppy controller (2). As can be seen in FIG. 3b, deactivation command (8) may also be followed by tape drive address (7). As shown in FIGS. 3a and 3b, tape drive address (7) is identical and thus each command would act upon the same drive. Again, as can be seen in FIG. 3b, deactivation command (8) is shown simply as a sequence of eight pulses for understanding only. In actuality, the unutilized command of 47 pulses is used for the reasons stated earlier. Again, other possibilities also exist.

Figure 4B:
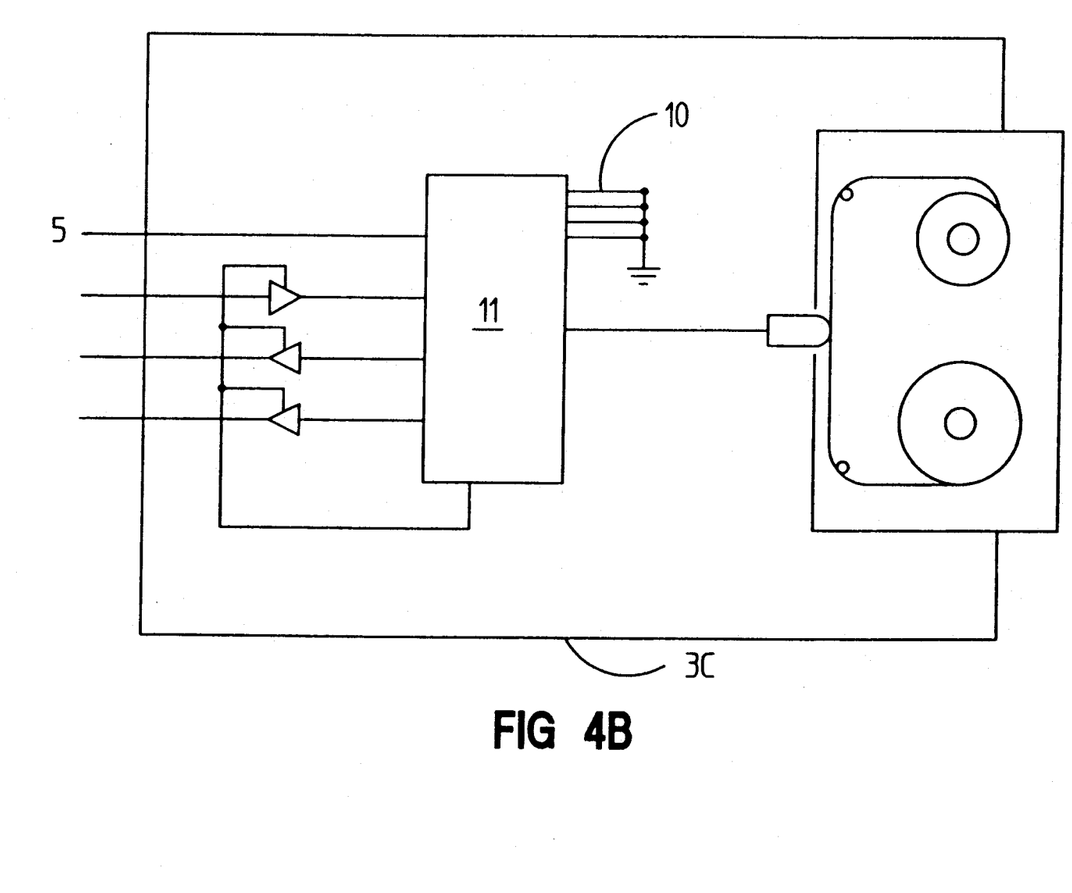
FIG. 4b is a schematic view of a device according to the present invention with no select line connection.

Referring to FIG. 4b, it can be seen how the best mode of the present invention is configured to recognize tape drive address (7). While naturally any number of possibilities exist as is well known to those skilled in this art, for commercial reasons the best mode at present of the invention utilizes interruptable surface wiring (10). This interruptable surface wiring (10) is advantageous because it inexpensively allows both a visual verification of the exact address of that particular tape drive and provides a means for changing the address. While, of course, DIP switches, ROM and other alterable devices can be used, interruptable surface wiring (10) serves as an advantage in reducing costs and providing the visual confirmation desired. In use, the installer can visually observe the wiring configuration of the address. In the event another device utilizing a similar communication scheme has the same address, a wire can simply be interrupted or cut to allow an address change. Once changed, installation software can control the change of the address recognized by the floppy controller (2) to allow proper function. This software could naturally be contained in a programmable memory within main computer system (1).

Again, each of these techniques can be utilized in the deselect function as well. As seen in the claims, some claims have been included with respect to the deselect function. It will be noticed that such deselect claims do not explicitly hit so broad a spectrum of combinations of elements or steps as the select or activation claims. This is done for efficiency only. It is certainly intended that each select claim would easily encompass a similar deselect invention and vice versa. As such, such claims could easily be added and should be considered within the scope of protection afforded.

Importantly, the deselect function can also have an automatic alternative deselect path or routine. This is important as a computer system might be configured with a number of drives which may not have completely compatible communication schemes. In addition to deselecting computer tape drive (3c) through the mentioned commands issued by floppy controller (2), computer tape drive (3c) can also monitor other lines simultaneously while activated. In this fashion, computer tape drive (3c) would automatically "turn off" in the event another drive were simultaneously selected. This of course could consist of select lines (4a through 4d), however, it might also include other lines as one skilled in the art would easily recognize. As one example, a failsafe line could be connected to the select or motor enable lines traditionally utilized on a floppy controller. This allows a failsafe mechanism such that computer tape drive (3c) will not likely operate at the same time as another one of the peripheral devices (3). In the preferred embodiment, rather than test a separate line, pulse timing is utilized as those skilled in the art would readily understand.

As will be readily understood by those skilled in the art, the foregoing methods may be accomplished by the apparatus shown. With reference to the claims, it should be understood that the step of generating the particular command or address involved may be accomplished by a means for generating this aspect. This is shown in FIG. 2, the means for generating the command or address may be floppy controller logic (2a) or could be logic located in main computer system (1) or on computer tape drive (3c). Likewise, on computer tape drive (3c), some processing means (11) as shown in FIG. 4b may be included. Processing means (11) may include not only microprocessor circuitry but also memory circuitry or some means for storing values. Again, through programming as is well known in the art, processing means (11) could act as a means for comparing values. Likewise, floppy controller logic (2a) could act as a means for selecting values, producing values, and appending both commands and arguments.

The foregoing discussion and the claims which follow describe the preferred embodiments of the present invention. Particularly with respect to the claims, it should be understood that changes may be made without departing from the essence of the invention. In this regard such changes will naturally fall within the scope of the present invention. It is simply not practical to describe and claim all possible revisions to the present invention which may be accomplished. To the extent such revisions utilize the essence of the present invention, each would naturally fall within the breadth of protection encompassed by this patent. This is particularly true for the present invention since its basic concepts and understandings are fundamental in nature and can be broadly applied not only to a variety of devices, but also in a variety of manners.

We claim:

1. A method of activating a computer tape drive through utilization of a floppy controller comprising the steps of:
   a. establishing a communication path between said tape drive and said floppy controller; then
   b. transmitting a single activation command across said communication path; then c. sensing the presence of said activation command on said communication path through operation of said tape drive; then d. initiating the operation of said tape drive upon sensing said activation command.

2. A method of activating a computer tape drive through utilization of a floppy controller as described in claim 1 and further comprising the step of selecting said single activation command for said tape drive prior to accomplishing said step of transmitting said activation command across said communication path.

3. A method of activating a computer tape drive through utilization of a floppy controller as described in claim 2 wherein said step of selecting said activation command for said tape drive comprises the step of generating a tape address to indicate said tape drive.

4. A method of activating a computer tape drive through utilization of a floppy controller as described in claim 3 wherein said step of selecting an activation command for said tape drive further comprises the step of specifying a predetermined select code prior to accomplishing said step of transmitting said activation command across said communication path.

5. A method of activating a computer tape drive through utilization of a floppy controller as described in claim 4 wherein said step of selecting an activation command for said tape drive further comprises the step of combining said predetermined select code and said tape address to create said activation command prior to accomplishing said step of transmitting said activation command across said communication path.

6. A method of activating a computer tape drive through utilization of a floppy controller as described in claim 5 wherein said step of specifying a predetermined select code comprises the step of utilizing a digital code which has no other function in relationship to the operation of said tape drive.

7. A method of utilizing a floppy controller to selectively activate a computer tape drive peripheral device comprising the steps of:

a. selecting an activation command for said tape drive; then b. transmitting said activation command to said tape drive through operation of said floppy controller; then c. receiving said activation command for processing by said tape drive; then d. comparing said activation command to a preset code associated with said tape drive; then e. activating said tape drive upon proper comparison of said activation command to said preset code.

8. A method of utilizing a floppy controller to selectively activate a computer tape drive peripheral device as described in claim 7 wherein said step of transmitting said activation command across said communication path comprises the step of serially issuing said activation command to said communication path.

9. A method of utilizing a floppy controller to selectively activate a computer tape drive peripheral device as described in claim 8 wherein said floppy controller has a step line and wherein said step of serially issuing said activation command to said communication path comprises the step of outputting said activation command to said step line.

10. A method of utilizing a floppy controller to selectively activate a computer tape drive peripheral device as described in claim 7 or 9 and further comprising the step of selecting said activation command for said tape drive prior to accomplishing said step of transmitting said activation command across said communication path.

11. A method of utilizing a floppy controller to selectively activate a computer tape drive peripheral device as described in claim 10 wherein said step of selecting said activation command for said tape drive comprises the step of generating a tape address to indicate said tape drive.

12. A method of utilizing a floppy controller to selectively activate a computer tape drive peripheral device as described in claim 11 wherein said step of selecting an activation command for said tape drive further comprises the step of specifying a predetermined select code prior to accomplishing said step of transmitting said activation command across said communication path.

13. A method of utilizing a floppy controller to selectively activate a computer tape drive peripheral device as described in claim 12 wherein said step of selecting an activation command for said tape drive further comprises the step of combining said predetermined select code and said tape address to create said activation command prior to accomplishing said step of transmitting said activation command across said communication path.

14. A method of utilizing a floppy controller to selectively activate a computer tape drive peripheral device as described in claim 13 wherein said step of specifying a predetermined select code comprises the step of utilizing a digital code which has no other function in relationship to the operation of said tape drive.

15. A method of utilizing a floppy controller to selectively activate a computer tape drive peripheral device comprising the steps of:

a. selecting a specific activation command for said tape drive from a number of alternative activation command possibilities; then b. transmitting said specific activation command to said tape drive through operation of said floppy controller; then c. receiving said specific activation command for processing by said tape drive; then d. initiating the operation of said tape drive upon receipt of said activation command.

16. A method of utilizing a floppy controller to selectively activate a computer tape drive peripheral device as described in claim 15 wherein said step of selecting an activation command for said tape drive comprises the step of specifying a predetermined select command.

17. A method of utilizing a floppy controller to selectively activate a computer tape drive peripheral device as described in claim 16 wherein said step of selecting an activation command for said tape drive further comprises the step of choosing an argument to be associated with said predetermined select command prior to accomplishing said step of transmitting said activation command across said communication path.

18. A method of utilizing a floppy controller to selectively activate a computer tape drive peripheral device as described in claim 17 wherein said step of choosing an argument to be associated with said predetermined select command comprises the step of generating a tape address to indicate said tape drive.

19. A method of utilizing a floppy controller to selectively activate a computer tape drive peripheral device as described in claim 18 wherein said step of selecting an activation command for said tape drive further comprises the step of combining said predetermined select command and said tape address to create said activation command prior to accomplishing said step of transmitting said activation command across said communication path.

20. A method of utilizing a floppy controller to selectively activate a computer tape drive peripheral device as described in claim 19 wherein said step of specifying a predetermined select command comprises the step of utilizing a digital code which has no other function in relationship to the operation of said tape drive.

21. A method of utilizing a floppy controller to selectively activate a computer tape drive peripheral device as described in claim 20 wherein said step of utilizing a digital code comprises the step of utilizing only one such digital code.

22. A method of utilizing a floppy controller to selectively activate a computer tape drive peripheral device as described in claim 19 wherein said step of transmitting a single activation command across said communication path comprises the step of serially issuing said activation command to said communication path.

23. A method of utilizing a floppy controller to selectively activate a computer tape drive peripheral device as described in claim 22 wherein said floppy controller has a step line and wherein said step of serially issuing said activation command to said communication path comprises the step of outputting said activation command to said step line.

24. A method of utilizing a floppy controller to selectively activate a computer tape drive peripheral device as described in claim 7 and further comprising the step of comparing said activation command to a distinctive identification code associated with said tape drive after receiving said command and wherein said step of initiating the operation of said tape drive comprises the step of activating said tape drive upon successful comparison of said activation command to said distinctive identification code.

25. A method of utilizing a floppy controller to selectively activate a computer tape drive peripheral device as described in claim 24 wherein said step of selecting said activation command for said tape drive comprises the step of generating a tape address to indicate said tape drive.

26. A method of utilizing a floppy controller to selectively activate a computer tape drive peripheral device as described in claim 25 wherein said step of selecting an activation command for said tape drive further comprises the step of specifying a predetermined select code prior to accomplishing said step of transmitting said activation command across said communication path.

27. A method of utilizing a floppy controller to selectively activate a computer tape drive peripheral device as described in claim 26 wherein said step of selecting an activation command for said tape drive further comprises the step of combining said predetermined select code and said tape address to create said activation command prior to accomplishing said step of transmitting said activation command across said communication path.

28. A method of utilizing a floppy controller to selectively activate a computer tape drive peripheral device as described in claim 27 wherein said step of specifying a predetermined select code comprises the step of utilizing a digital code which has no other function in relationship to the operation of said tape drive.

29. A method of utilizing a floppy controller to selectively activate a computer tape drive peripheral device as described in claim 28 wherein said step of utilizing a digital code comprises the step of utilizing only one such digital code.

30. A method of utilizing a floppy controller to selectively activate a computer tape drive peripheral device as described in claim 27 wherein said step of transmitting said activation command across said communication path comprises the step of serially issuing said activation command to said communication path.

31. A method of utilizing a floppy controller to selectively activate a computer tape drive peripheral device as described in claim 30 wherein said floppy controller has a step line and wherein said step of serially issuing said activation command to said communication path comprises the step of outputting said activation command to said step line.

32. A method of utilizing a floppy controller to selectively activate a computer tape drive peripheral device as described in claim 24 or 27 and further comprising the step of storing said distinctive identification code on said tape drive device prior to accomplishing said step of comparing said activation command to said distinctive identification code associated with said tape drive.

33. A method of utilizing a floppy controller to selectively activate a computer tape drive peripheral device as described in claim 32 wherein said step of storing said distinctive identification code on said tape drive device comprises the step of reading said distinctive identification code into a memory means located on said tape drive device.

34. A method of utilizing a floppy controller to selectively activate a computer tape drive peripheral device as described in claim 24 wherein said step of selecting said activation command for said tape drive comprises the step of generating a tape address to indicate said tape drive and wherein said step of comparing said activation command to said distinctive identification code associated with said tape drive comprises the step of ascertaining if said distinctive identification code is equal to said tape address.

35. A method of utilizing a floppy controller to selectively activate a computer tape drive peripheral device as described in claim 34 wherein said step of ascertaining if said distinctive identification code is equal to said tape address comprises the step of processing a set of instructions stored on said tape drive device.

36. A method of utilizing a floppy controller to selectively activate a computer tape drive peripheral device as described in claim 25 wherein said step of selecting an activation command for said tape drive further comprises the step of indicating additional information which is capable of being processed by said tape drive device.

37. A method of utilizing a floppy controller to selectively activate a computer tape drive peripheral device as described in claim 36 wherein said step of indicating additional information which is capable of being processed by said tape drive device comprises the step of designating an extended address.

38. A method of utilizing a floppy controller to selectively activate a computer tape drive peripheral device as described in claim 37 wherein said step of designating an extended address comprises the step of appending a security code to said tape address.

39. A method of utilizing a floppy controller to selectively activate a computer tape drive peripheral device as described in claim 37 wherein said step of selecting an activation command for said tape drive further comprises the step of specifying a predetermined select code prior to accomplishing said step of transmitting said activation command across said communication path prior to accomplishing said step of transmitting said activation command across said communication path.

40. A method of utilizing a floppy controller to selectively activate a computer tape drive peripheral device as described in claim 39 wherein said step of selecting an activation command for said tape drive further comprises the step of combining said predetermined select code, said tape address, and said extended address to create said activation command prior to accomplishing said step of transmitting said activation command across said communication path.

41. A method of utilizing a floppy controller to selectively activate a computer tape drive peripheral device as described in claim 40 wherein said activation command comprises a digital code and further comprising the step of utilizing only one such digital code to transmit across said communication path.

42. A method of utilizing a floppy controller to selectively activate a computer tape drive peripheral device as described in claim 40 wherein said step of transmitting said activation command across said communication path comprises the step of serially issuing said activation command to said communication path.

43. A method of utilizing a floppy controller to selectively activate a computer tape drive peripheral device as described in claim 42 wherein said floppy controller has a step line and wherein said step of serially issuing said activation command to said communication path comprises the step of outputting said activation command to said step line.

44. A method of utilizing a floppy controller to selectively activate a computer tape drive peripheral device as described in claim 36 or 43 and further comprising the step of storing said distinctive identification code on said tape drive device prior to accomplishing said step of comparing said activation command to said distinctive identification code associated with said tape drive.

45. A method of utilizing a floppy controller to selectively activate a computer tape drive peripheral device as described in claim 44 wherein said step of storing said distinctive identification code on said tape drive device comprises the step of reading said distinctive identification code into a memory means located on said tape drive device.

46. A method of utilizing a floppy controller to selectively activate a computer tape drive peripheral device as described in claim 45 wherein said step of comparing said activation command to said distinctive identification code associated with said tape drive comprises the step of ascertaining if said distinctive identification code is equal to said tape address.

47. A method of utilizing a floppy controller to selectively activate a computer tape drive peripheral device as described in claim 46 and further comprising the step of comparing said extended address prior to accomplishing said step of activating said tape drive.

48. A method of utilizing a floppy controller to selectively activate a computer tape drive peripheral device as described in claim 47 wherein said step of ascertaining if said distinctive identification code is equal to said tape address and said step of comparing said extended address comprise the step of processing a set of instructions stored on said tape drive device.

49. A method of utilizing a floppy controller to selectively activate a computer tape drive peripheral device as described in claim 46 wherein said step of comparing said extended address comprises the step of conditionally correlating said extended address with said distinctive identification code prior to accomplishing said step of activating said tape drive.

50. A method of utilizing a floppy controller to selectively activate a computer tape drive peripheral device as described in claim 49 and further comprising the step of transmitting a predetermined message after accomplishing said step of conditionally correlating said extended address with said distinctive identification code.

51. A method of disengaging a computer tape drive through utilization of a floppy controller comprising the steps of:
 a. establishing a communication path between said tape drive and said floppy controller; then
 b. transmitting a deselect command across said communication path; then
 c. sensing the presence of said deselect command on said communication path through operation of said tape drive; then
 d. disengaging the operation of said tape drive upon sensing said deselect command.

52. A method of disengaging a computer tape drive through utilization of a floppy controller as described in claim 51 wherein said step of transmitting a deselect command across said communication path comprises the step of serially issuing said deselect command to said communication path.

53. A method of disengaging a computer tape drive through utilization of a floppy controller as described in claim 52 wherein said floppy controller has a step line and wherein said step of serially issuing said deselect command to said communication path comprises the step of outputting said deselect command to said step line.

54. A method of disengaging a computer tape drive through utilization of a floppy controller as described in claim 51 or 53 and further comprising the step of selecting said deselect command for said tape drive prior to accomplishing said step of transmitting said activation deselect command across said communication path.

55. A method of utilizing a floppy controller to disengage a computer tape drive peripheral device comprising the steps of:
 a. communicating to said floppy controller the desire to disengage said tape drive peripheral device; then
 b. transmitting a deselect command to said tape drive through operation of said floppy controller; then
 c. receiving said deselect command for processing by said tape drive; then
 d. comparing said deselect command to a preset code associated with said tape drive; then
 e. disengaging said tape drive upon proper comparison of said deselect command to said preset code.

56. A method of utilizing a floppy controller to selectively disengage a computer tape drive peripheral device as described in claim 55 wherein said step of transmitting said deselect command across said communication path comprises the step of serially issuing said deselect command to said communication path.

57. A method of utilizing a floppy controller to selectively disengage a computer tape drive peripheral device as described in claim 56 wherein said floppy controller has a step line and wherein said step of serially issuing said deselect command to said communication path comprises the step of outputting said deselect command to said step line.

58. A method of utilizing a floppy controller to selectively disengage a computer tape drive peripheral device as described in claim 55 and further comprising the step of comparing said deselect command to a distinctive identification code associated with said tape drive after receiving said deselect command and wherein said step of disengaging the operation of said tape drive comprises the step of disengaging said tape drive upon successful comparison of said deselect command to said distinctive identification code.

59. A method of utilizing a floppy controller to selectively disengage a computer tape drive peripheral device comprising the steps of:
   a. selecting a specific deselect command for said tape drive from a number of alternative deselect command possibilities; then
   b. transmitting said specific deselect command to said tape drive through operation of said floppy controller; then
   c. receiving said specific deselect command for processing by said tape drive; then
   d. disengaging the operation of said tape drive upon receipt of said deselect command.

60. A method of disengaging a computer tape drive through utilization of a floppy controller as described in claim 51 or 53 and further comprising the step of selecting said deselect command for said tape drive prior to accomplishing said step of transmitting said deselect command across said communication path.

61. A method of disengaging a computer tape drive through utilization of a floppy controller as described in claim 54 wherein said step of selecting said deselect command for said tape drive comprises the step of generating a tape address to indicate said tape drive.

62. A method of safely controlling a computer tape drive through utilization of a floppy controller comprising the steps of:
   a. configuring said floppy controller to disengage said computer tape drive upon command; then
   b. establishing an independent operation which also acts to disengage said tape drive.

63. A method of safely controlling a computer tape drive through utilization of a floppy controller as described in claim 62 wherein said step of establishing an independent operation which also acts to disengage said tape drive comprises the step of utilizing an indication that another peripheral device has been selected by said floppy controller to be activated.

64. A method of safely controlling a computer tape drive through utilization of a floppy controller as described in claim 63 wherein said step of utilizing an indication that another peripheral device has been selected by said floppy controller to be activated comprises the steps of:
   a. sensing said selection of said other peripheral device by said floppy controller by operation of said computer tape drive; then
   b. automatically disengaging said computer tape drive by operation of said computer tape drive.

65. A method of safely controlling a computer tape drive through utilization of a floppy controller as described in claim 64 wherein said floppy controller has a select line, and wherein said step of sensing said selection of said other peripheral device by said floppy controller by operation of said computer tape drive comprises the step of monitoring said select line.

66. A method of safely controlling a computer tape drive through utilization of a floppy controller as described in claim 64 or 65 wherein said floppy controller has a step line, and wherein said step of sensing said selection of said other peripheral device by said floppy controller by operation of said computer tape drive comprises the step of monitoring said step line.

67. A computer system for controlling the selection of a tape drive comprising:
   a. floppy controller capable of controlling a number of peripheral drive devices including said tape drive;
   b. a means for generating a single selection command from said floppy controller to select said tape drive;
   c. a communication path for transmitting said selection command from said floppy controller to said peripheral drive devices;
   d. a tape drive device responsive to said floppy controller wherein said tape drive further comprises:
      1) a means for storing a unique identification code specific to said tape drive;
      2) a means for comparing said selection command to said unique identification code; and
      3) a means for selecting the operation of said tape drive upon acceptable comparison of said unique identification code and said selection command.

68. A computer system for controlling the selection of a tape drive as described in claim 67 wherein said means for generating comprises:
   a. a means for producing a standard selection command; and
   b. a means for appending an address to said standard selection command.

69. A computer system for controlling the selection of a tape drive as described in claim 67 wherein said means for comparing comprises:
   a. a programmable microprocessor;
   b. a means for storing a comparison routine executable on said programmable microprocessor.

70. A computer system for controlling the selection of a tape drive as described in claim 69 wherein said means for generating comprises:
   a. a means for producing a standard selection command; and
   b. a means for appending an address to said standard selection command.

71. A computer system for controlling the selection of a tape drive as described in claim 70 wherein said means for storing said comparison routine stores an instruction set which causes said programmable microprocessor to compare said address to said unique identification code.

72. A computer system for controlling the selection of a tape drive as described in claim 67, 68, or 71 wherein said floppy controller comprises a select line and wherein said communication path comprises said select line.

73. A computer system for controlling the selection of a tape drive as described in claim 68 or 71 and further comprising a means for serially transmitting said standard selection command and said address across said communication path.

74. A computer system for controlling the selection of a tape drive as described in claim 68 or 71 wherein said means for storing a unique identification code specific to said tape drive is physically alterable.

75. A computer system for controlling the selection of a tape drive as described in claim 74 wherein said means for storing a unique identification code specific to said tape drive comprises interruptable surface wiring.

76. A computer system for controlling the selection of a tape drive as described in claim 75 wherein said interruptable surface wiring encode said address.

77. A computer system for controlling the selection of a tape drive as described in claim 68 or 71 wherein said means for storing a unique identification code specific to said tape drive comprises a programmable memory.

78. A computer system for controlling the selection of a tape drive as described in claim 74 wherein said means for storing a unique identification code specific to said tape drive comprises board mounted switches.

* * * * *